United States Patent [19]
Bonacci et al.

[11] 3,844,934
[45] Oct. 29, 1974

[54] DUAL CATALYST CONVERTER PROCESS

[75] Inventors: John C. Bonacci, Cherry Hill; Kenneth M. Mitchell, Marlton, both of N.J.

[73] Assignee: Mobil Oil Corporation, New York, N.Y.

[22] Filed: Mar. 6, 1973

[21] Appl. No.: 338,467

[52] U.S. Cl.................. 208/66, 208/146, 23/288 R
[51] Int. Cl............................................. C10g 37/10
[58] Field of Search ................ 208/146, 49, 62, 66; 23/288 R

[56]       References Cited
       UNITED STATES PATENTS

| | | | |
|---|---|---|---|
| 2,257,178 | 9/1941 | Martin et al. | 23/288 |
| 2,307,895 | 1/1943 | Naiman et al. | 23/288 |
| 2,311,318 | 2/1943 | Tyson et al. | 208/146 |
| 2,355,198 | 8/1944 | Atwell | 208/146 |
| 2,596,145 | 5/1952 | Grote | 208/66 |
| 3,201,340 | 8/1965 | Decker | 23/288 |
| 3,395,094 | 7/1968 | Weisz | 208/62 |
| 3,509,043 | 4/1970 | McMaster et al. | 208/146 |

*Primary Examiner*—Herbert Levine
*Attorney, Agent, or Firm*—A. L. Gaboriault

[57]        ABSTRACT

A catalytic converter and method of operating the same is described for the use of two beds of catalyst of different characteristics arranged in series in the same reactor and provided with valving and operating characteristics such that the two catalysts may be used in the same manner as though they were disposed in parallel reactors.

1 Claim, 3 Drawing Figures

FLOW LEGEND

-------- Catalyst A only
       Valves 5, 2, 3 open
       Valves 1, 4 closed

—·—·— Catalyst B only
       Valves 5, 4 open
       Valves 1, 2, 3 closed

—x— Catalyst A and B
       Valves 1, 4 open
       Valves 5, 2, 3 closed

FLOW LEGEND

------- Catalyst A only
Valves 5, 2, 3 open
Valves 1, 4 closed

—·— Catalyst B only
Valves 5, 4 open
Valves 1, 2, 3 closed

—x— Catalyst A and B
Valves 1, 4 open
Valves 5, 2, 3 closed

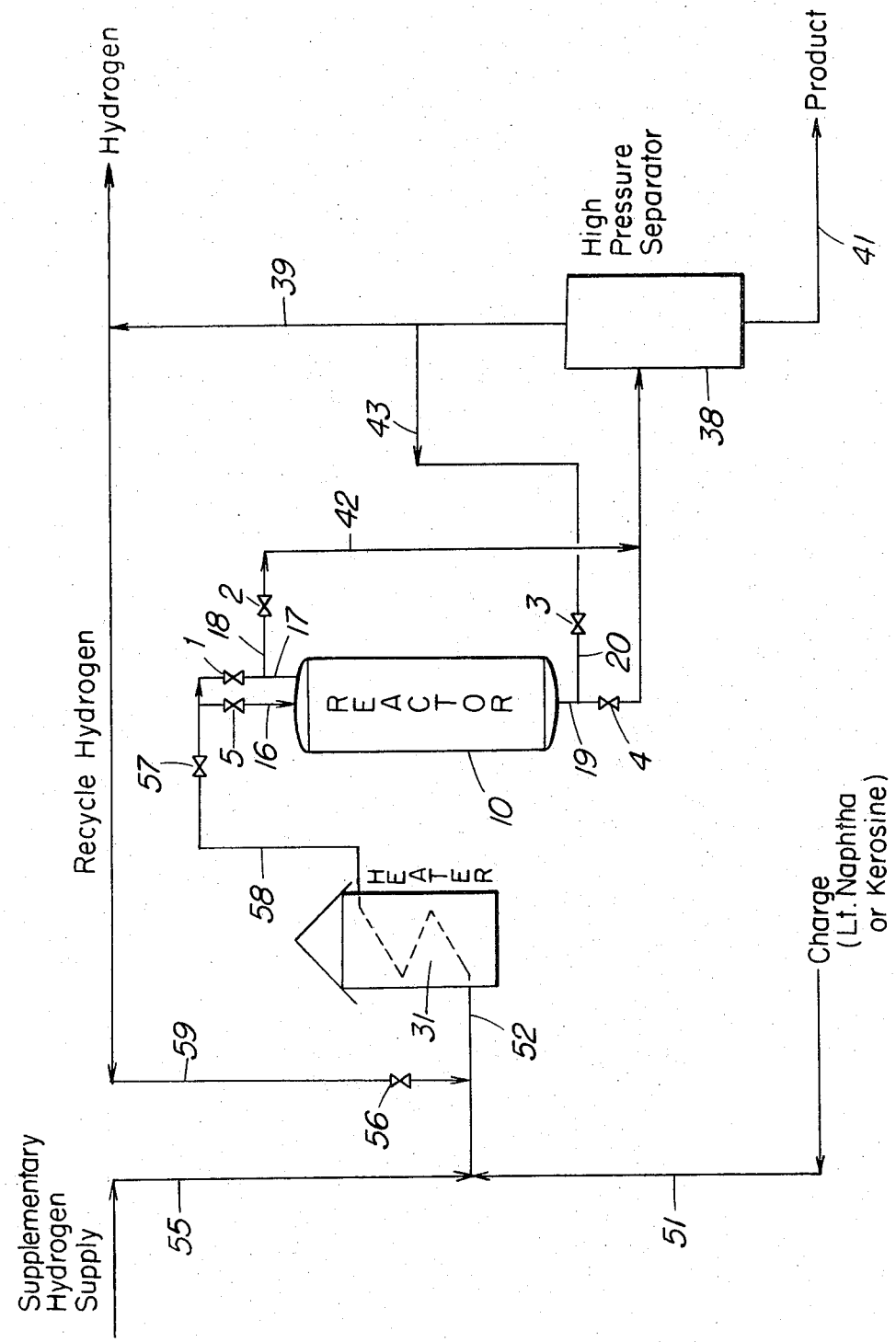

DUAL CATALYST CONVERTER PROCESS

BACKGROUND OF THE INVENTION

In catalytic processing, particularly processing of petroleum hydrocarbons for the preparation of fuels and other hydrocarbon products based on petroleum, it is often necessary to pass reactants through two catalyst beds in series. Under certain circumstances it becomes desirable to use only one of the catalyst beds and by-pass the other. For example, in compensating for the differing demand with change of seasons, the character or relative volume of motor fuel produced may vary considerably from summer to winter. Another instance of need for use of catalyst beds separately arises in what is known as "blocked out" processing wherein one product is produced for a predetermined period of time and the catalytic equipment is thereafter used to prepare a different type of product. Such need is occasioned with respect to many products of relatively low volume on which it is economic only to operate the equipment at near maximum capacity but the quantity of product needed is far less than that which could keep the equipment operating continuously at optimum sizes for any extended period of time.

Conventional practice in the art has been to arrange each different catalyst in separate reactors in order to afford flexibility of use. In some limited classes of operations the feature of flexibility has been sacrificed by placing two catalyst beds in series in the same reactor and compromising on product quality by tolerating the effect of both catalysts at all times of operation.

As will be readily apparent, costs rise very rapidly with multiplication of catalyst vessels with their need to be fabricated of corrosion resistant metals having sufficient wall thickness to sustain the pressures incurred during operation at high temperatures, and the need of each for auxiliary equipment such as valves, compressors, heat exchangers and the like.

SUMMARY OF THE INVENTION

According to this invention the flexibility of being able to use two beds of distinct and different catalyst in series, in parallel or independently is provided by a unique catalytic vessel and unique valving for the same. This results in very large savings in capital cost and in operating expense.

BRIEF DESCRIPTION OF THE DRAWING

In the annexed drawing

FIG. 3 is a flow diagram for a unit that can be used either to process kerosine to remove sulfur and improve color or to selectively hydrocrack paraffinic charge stocks. The single reactor is modified in accordance with this invention.

DESCRIPTION OF PREFERRED EMBODIMENTS

Figure 1:
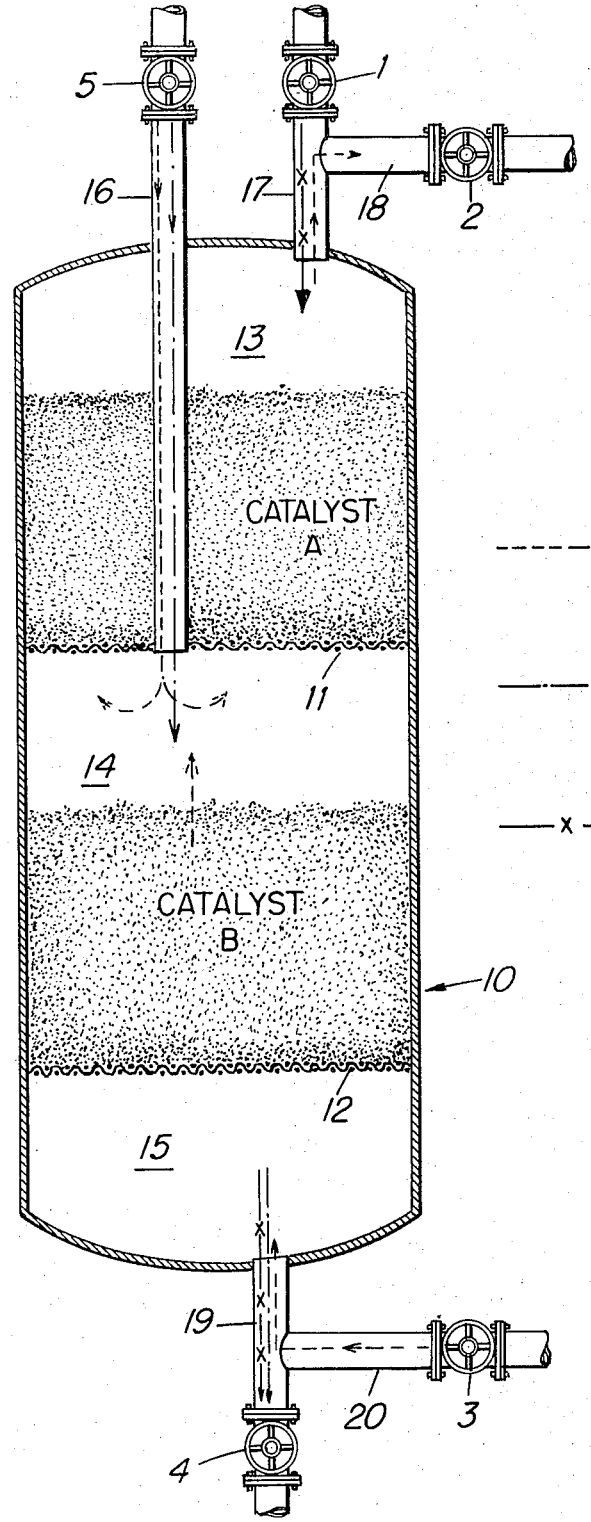
FIG. 1 is a representation in vertical section of a catalyst vessel according to the present invention with flow legends applied thereon to demonstrate the process aspects of the invention.

Referring specifically to FIG. 1, the invention may be embodied in a vertical catalytic converter defined by a metallic outer shell 10 of suitable material and thickness to sustain the service for which the reactor is designed. Exteriorly of the shell the vessel will be protected against heat loss by insulation, not shown.

Within the shell 10 are an upper catalyst supporting screen 11 and a lower catalyst supporting screen 12. When catalyst beds are loaded onto the screens 11 and 12 they define two areas of catalyst, here designated as "Catalyst A" and "Catalyst B." The depth of catalyst in each bed is so arranged as to provide an open space thereabove, whereby the catalyst filled vessel has a plenum chamber 13 above catalyst bed A, a second plenum chamber 14 intermediate the two beds and a third plenum chamber 15 below the bed of Catalyst B.

A charge inlet pipe 16 provided with a valve 5 extends downwardly through the top of the vessel 10 to an open end of pipe 16 at or below the screen 11. Thus the inlet pipe 16 communicates with plenum chamber 14 intermediate the two catalyst beds.

Each of two other connections to the interior of the catalyst vessel is arranged and adapted for either supply or withdrawal, at the will of the operator, of fluids, either liquid or gas, to the two plenum chambers 13 and 15 at the top and bottom, respectively, of the dual catalyst reactor. It will be seen that pipe 17 communicates with the upper plenum chamber 13 above the bed of Catalyst A through an opening in the top of the reactor shell 10. Pipe 17 is furnished with a valve 1 and with a branch 18 to which is fitted a valve 2.

In similar fashion the plenum chamber 15 is in communication with pipe 19 passing through the bottom of the shell 10. The pipe 19 bears a valve 4 and a branch line 20 fitted with a valve 3.

When it is desired to conduct a catalytic conversion utilizing Catalyst A only, valves 5, 2 and 3 are opened while valves 1 and 4 are maintained in closed position. Referring to the flow legend appearing in association with FIG. 1, flow of gases within the reactor follow the paths indicated by the characteristic broken line for reaction over Catalyst A only. Reactant is admitted to pipe 16 through valve 5, flows to the plenum chamber 14 from which it passes upwardly through the bed of Catalyst A to be withdrawn by pipe 17, branch line 18 and the open valve 2.

During a period of using Catalyst A only, a purge gas having no effect or mild beneficial effect on the course of the reaction over Catalyst A is preferably admitted through valve 3 and branch line 20 into pipe 19 for introduction to plenum chamber 15. The purpose of this flow is to avoid diffusion of the desired reactants down into catalyst bed B. It requires only a modest flow of gas upwardly through Catalyst B in order to avoid such diversion of the reactants.

During a period when it is desired to use Catalyst B only the flow follows the characteristic broken line shown in the flow legend. For this operation valves 5 and 4 are open while valves 1, 2 and 3 remain closed. This causes the reactants to enter through open valve 5, flow through inlet pipe 16 to plenum chamber 14 from which they enter catalyst bed B.

Products of the reaction pass to plenum chamber 15 and are withdrawn from the reactor by pipe 19 through open valve 4. An obvious variant of the type of operation just described would be to introduce a modest flow through pipe 17 to inhibit any upward diffusion of reactants into catalyst bed A. This is directly parallel to the type of flow through pipe 20 described in connection with the use of Catalyst A alone.

According to the third mode of operation, the two catalyst beds A and B are utilized in series by passing charge sequentially through the beds. In this mode, valves 1 and 4 are open while valves 5, 2 and 3 are maintained in closed position. The charge enters plenum chamber 13 through pipe 17 and passes through the catalyst bed A into plenum chamber 14. Charge which has undergone conversion activated by Catalyst A passes from plenum chamber 14 through the bed of Catalyst B into plenum chamber 15 from which it is withdrawn through pipe 19 and the open valve 4.

EXAMPLE 1

Figure 2:
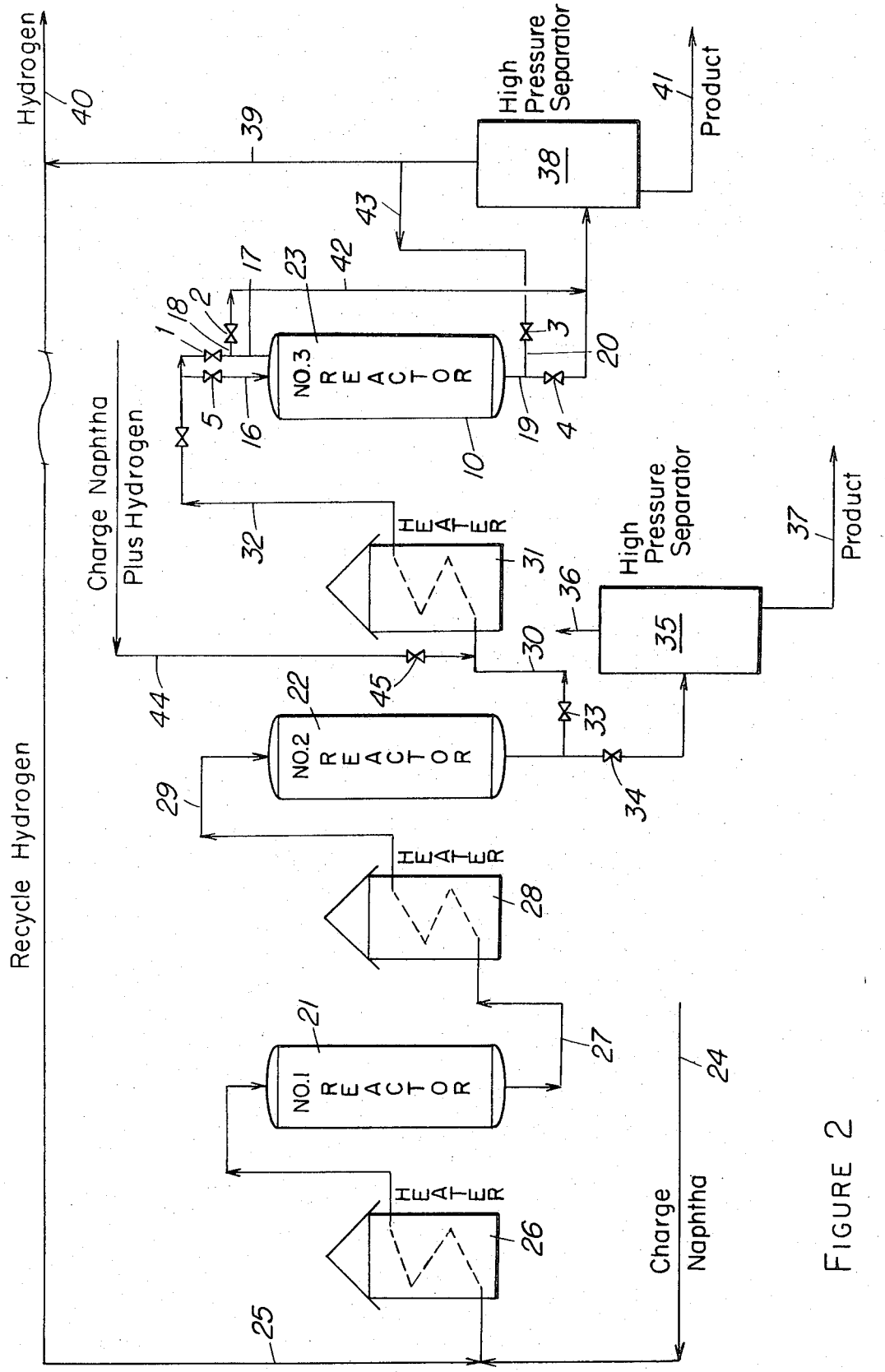
FIG. 2 is a flow diagram for processing of petroleum naphthas to prepare high quality gasoline by reforming the naphtha over conventional reforming catalyst and subjecting the reformate to shape selective hydrocracking. The last reactor in the naphtha processing flow is constructed and operated in accordance with the present invention.

A system for processing naphtha to high octane gasoline and propane is shown in FIG. 2. Essentially the flow sheet of FIG. 2 is a conventional catalytic reformer in which the third reactor has been modified in accordance with the present invention.

As is usual in this art, the charge naphtha is passed sequentially through three separate reactors, namely No. 1 reactor identified by reference character 21, No. 2 reactor identified as 22 and No. 3 reactor shown at 23. Charge naptha introduced through line 24 is admixed with hydrogen recycled in the process from line 25 and the mixture is admitted to a heater 26 wherein its temperature is raised to that desired for the reaction in reactor 21.

As usual in modern practice, the catalyst in reactor 21 is platinum or palladium impregnated on alumina of high surface area and treated with a halogen to impart a moderate degree of acidity. In reactor 21, cyclohexanes are dehydrogenated to aromatic compounds, alkyl cyclopentanes are isomerized to cyclohexanes which then undergo the dehydrogenation reaction and other reforming reactions of slower rate are initiated. Those other reactions include isomerization of paraffins and dehydrocyclization of paraffins. To a much lesser degree, catalytic hydrocracking of paraffins occurs.

The reactions taking place in reactor 21 are highly endothermic in character, resulting in a drop in temperature of the reactant mixture. The effluent of reactor 21 is then passed by line 27 to a heater 28 in which its temperature is again raised to that desired for the reaction and the heated, partially converted naphtha is transferred by line 29 to the second reactor 22 wherein the reforming reactions are continued with concurrent drop in temperature. The effluent of reactor 22 passes by line 30 to a third heater 31 and is then transferred by line 32 to the third reactor 23. The reforming reactions typical of the first two reactors may be continued in reactor 23. Most commercial installations of platinum reforming are equipped with three reactors containing platinum catalyst and the reactions are essentially continued in the same general nature through the three reactors.

The severity of reforming may be varied through the train of reactors by variations in temperature and other process parameters. Generally an operator will so adjust the conditions in the train of reactors as to obtain a product of a desired octane number at a yield which is maximized under all the conditions prevailing in the refinery in which the reformer is located. As the naphthenes are converted through the train of reactors, naphthene dehydrogenation becomes a less important reaction among those taking place and the reactions of lesser rate begin to become relatively more important. Thus, dehydrocyclization and hydrocracking of paraffins may be very important reactions in the third reactor of the train, increasing octane number by removal of paraffins, at least insofar as the increased severity is accomplished by hydrocracking of paraffins.

That hydrocracking of paraffins to increase octane number is non-selective, that the normal paraffins and isoparaffins are hydrocracked at similar rates. Actually, the more valuable isoparaffins crack somewhat more rapidly. This is relatively wasteful of charge stock since many of the isoparaffins are of good octane number value and should be retained if possible.

According to modern techniques, the normal paraffins of very low octane number may be selectively hydrocracked, while retaining high octane number isoparaffins. This is accomplished by passing the reformed naphtha through a bed of catalyst which has shape selective properties and will convert the normal paraffins to lighter hydrocarbons while excluding isoparaffins from the reaction.

A suitable catalyst for this purpose is described in U.S. Pat. No. 3,379,640 granted Apr. 23, 1968 on an application of N. Y. Chen and W. E. Garwood. According to the Chen et al. patent, a natural zeolite, such as erionite, is ion-exchanged with ammonium and thereafter with a metal having hydrogenation/dehydrogenation capabilities in order to incorporate acid and hydrogenation/dehydrogenation catalytic functions into the shape selective catalyst. The pores of natural erionite are of such size and shape as to admit normal paraffins to the interior of the catalyst for conversion and to inhibit the admission of molecules which have a greater molecular cross section than normal paraffins.

Thus a reformate made up largely of aromatic compounds and paraffins, with a slight residual amount of naphthenes but no olefins, can be brought in contact with the shape selective hydrocracking catalyst in the presence of hydrogen to good advantage. Of the paraffins present in the reformate, the straight chain compounds are of very low octane number while those of greater branching have progressively higher octane characteristics. The low octane straight chain compounds enter the pores of properly activated erionite and are there cracked to shorter molecules of lower boiling point. The fragments which result from cracking of straight chain paraffins on the acid sites in the erionite are of two kinds, one saturated portion and one unsaturated portion. The unsaturated olefinic fragment is promptly hydrogenated in the presence of hydrogen and the hydrogenation/dehydrogenation component of the catalyst.

Thereafter upon distillation of the reformate which has been subjected to shape selective hydrocracking, those portions of the cracked reformate which boil below the desired gasoline components are separated leaving substantially only cyclic compounds, primarily aromatic, and isoparaffins. Both of these classes are relatively high in octane number value.

If the catalyst for shape selective hydrocracking be properly chosen, such as nickel-acid erionite, a principal by-product of the shape selective hydrocracking is propane. This three carbon atom paraffin is the principal component of liquified petroleum gas sold in large quantities for heating, cooking, lighting etc. It will be apparent that the desirability of shape selective hydrocracking applied to reformate depends upon the relative value of an octane number boost in the gasoline and the value of the by-products. In those localities and at those times when propane has high value, often equivalent to the value of gasoline on a volume basis, it will be of enormous value to convert the low octane components of the gasoline into propane since this upgrades the gasoline without degrading the by-product. At other times and for other markets there may be desire for higher volume of gasoline with no real credit for by-product propane. In general the refiner has several routes for meeting octane specifications and it is at certain times and places economic to bypass the shape selective hydrocracking of reformate.

Given a refinery situation, having regard to type of crude available and the types of products and prices characterizing the relevant market area, the refiner contemplating shape selective hydrocracking of reformate may desire the flexibility of operating with or without that step in his processing. In such cases it has been customary to place the shape selective hydrocracking catalyst in a separate reactor apart from the reforming train, despite the recognized economies in capital expenditure and operating cost of devoting the bottom of the third reactor to shape selective hydrocracking catalyst.

The present invention provides a means for obtaining the desired flexibility of refinery operation and the desired minimal capital and operating expense characteristic of placing the shape selective hydrocracking catalyst in the bottom of the third reactor. In essence, the reactor shown in FIG. 1 is a provision of two separate catalysts having different actions and capable of being operated as though the two catalysts were in separate distinct reactors which could be placed in either parallel or series. The third reactor of FIG. 2 is of the character shown in FIG. 1 and illustrates how the present invention may be applied to a combination reforming/shape selective hydrocracking operation to concurrently produce high octane gasoline and propane or to make a larger yield of gasoline (at lower octane number) by elimination of the shape selective hydrocracking step. It is recognized that reforming to increase octane number is normally accomplished at a net loss in volume. The critical factor is comparison of octane number increase compared to product loss, having regard to all the factors affecting profit of the refining facility.

In applying the parallel bed reactor concept of this invention to a reformer/shape selective hydrocracker, as shown in FIG. 2, the reference numbers applied to FIG. 1 indicate similar elements in FIG. 2. However, the connections to the third reactor are further modified in this train to provide for isolation of that No. 3 reactor. Thus, valves 33, 34 and 45 (open 34, close 33, open 45) make it possible to divert reformate formed in reactors Nos. 1 and 2 to a high pressure separator 35 (like that normally appearing after reactor No. 3) from which hydrogen recycle gas is drawn by outlet 36 for recycle to the charge line 25 by connections not here shown. Product naphtha of increased octane number is withdrawn by line 37 for finishing, blending etc. By contrast, the entire train is employed when valve 34 and 45 are closed and valve 33 is open.

In that latter case (flow through the entire train of reactors), one type of operation involves reheat in heater 31 of No. 2 reactor effluent and passage through line 32, open valve 1 and inlet pipe 17 to the upper plenum chamber 13. From plenum chamber 13, the reactants pass serially through catalyst A (normally platinun on alumina reforming catalyst like that in Nos. 1 and 2 reactors), plenum chamber 14 and catalyst B which is NiH erionite shape selective hydrocracking catalyst. The fully reacted product is withdrawn through open valve 4 and passed by line 19 to high pressure separator 38 from which hydrogen rich gas passes overhead by line 39 to supply recycle hydrogen in line 25. A portion of the hydrogen generated by the reforming reaction and not consumed by hydrocracking may be withdrawn at 40 for other uses. Product leaves the high pressure separator 38 by line 41 for finishing, blending, etc.

When it is desired to by-pass shape selective hydrocracking, valve 5 is opened and valve 1 is closed. Effluent of heater 31 then passes through pipe 16 to plenum chamber 14, thence upwardly through reforming catalyst A to plenum chamber 13 from which product is withdrawn through open valve 2 and passed by line 42 to high pressure separator 38; valves 1 and 4 being closed. Preferably, a small amount of inert gas is admitted through open valve 3 to plenum chamber 15 to flow upwardly through catalyst B, inhibiting diffusion of reactive material into that catalyst. A convenient source of inert gas is hydrogen recycle flowing in line 39. In the embodiment shown, line 43 serves to supply that gas for the purpose stated.

According to a third alternative type of operation, when No. 3 reactor is isolated from the reforming train in the manner stated above, No. 3 reactor may be employed for shape selective hydrocracking of stocks other than reformate, e.g. virgin naphthas. Such naphtha (or other charge) admixed with hydrogen is admitted by line 44 to heater 31 from which it passes through open valve 5 to plenum chamber 14, catalyst B and plenum chamber 15 to line 19. Valve 4 being open and valve 3 being closed, the product is diverted to high pressure separator 38. It will be apparent that a small amount of purge gas may be passed through line 17 to avoid diffusion of reactive materials into the bed of catalyst A in a manner analogous to that employed when catalyst B is out of service as described above.

Table I compares results from a typical run using both catalyst beds of the last reactor with results obtained using only catalyst A of No. 3 reactor. The reformer part of the train (reactor Nos. 1 and 2 and catalyst bed A of No. 3 reactor) are operated on a $C_6$-330°F. naphtha blended from Light Arabian and Nigerian naphthas. Effluent from the train along with operating conditions and product values are shown in the table for both catalyst configurations.

Another variation with reactor No. 3 in the train is operation with reactors Nos. 1 and 2 and only catalyst B of No. 3 reactor. This option might be desirable under special circumstances. It is also implicit that the varied catalyst configurations resulting from this invention allow the unit to be re-optimized for each arrangement. This will increase the flexibility of operation and provide opportunity for other advantages obvious to those skilled in the art.

TABLE I

REFORMING/SHAPE SELECTIVE HYDROCRACKING
Charge: $C_6$–330°F. Light Arabian
Nigerian Mix

| Mode of Operation: | RUN IA<br>Catalyst A of<br>No. 3 Reactor | RUN IB<br>Catalyst A<br>and B of<br>No. 3<br>Reactor |
|---|---|---|
| Product Yield, wt.%<br>of charge: | | |
| $H_2$ Production,<br>SCF/BBL | 864 | 576 |
| $C_1$ | 2.3 | 2.7 |
| $C_2$ | 3.4 | 3.8 |
| $C_3$ | 4.9 | 11.6 |
| $iC_4$ | 2.2 | 1.5 |
| $nC_4$ | 3.3 | 1.9 |
| $iC_5$ | 4.7 | 3.2 |
| $nC_5$ | 4.0 | 0.7 |
| $C_6+$ | 73.4 | 73.4 |
| Product Octane,<br>$C_5$+R+3 | 101.6 | 101.6 |
| Estimated Product<br>Value, Δ$/CD Summer | +802 | 0 |
| Winter | 0 | +365 |
| Operating Conditions: | | |
| Pressure, psig | 380 | 380 |
| Charge Rate, B/SD | 26,000 | 26,000 |
| Catalyst Fills, Tons | | |
| Reactor 1 | 13.6 | 13.6 |
| Reactor 2 | 46.6 | 46.6 |
| Reactor 3A | 29 | 29 |
| Reactor 3B | 26 | 26 |
| Total Recycle Ratio,<br>mol/mol | 10 | 10 |
| $H_2$ Purity, mol % | | |
| Start of cycle | 74 | 61 |
| End of cycle | 66 | 50 |

Typical results for shape selective hydrocracking (catalyst B) of virgin naphtha with reactor No. 3 isolated from the reformer train are shown in Table II.

TABLE II

SHAPE SELECTIVE HYDROCRACKING OF VIRGIN NAPHTHA
CHARGE: $C_5$–180° KIRKUK NAPHTHA

| Yield, Wt. % of<br>Hydrocarbon Charge | Charge | Product |
|---|---|---|
| $C_1$ | | .6 |
| $C_2$ | | 1.2 |
| $C_3$ | | 18.9 |
| $iC_4$ | | .4 |
| $nC_4$ | | 6.2 |
| $iC_5$ | 22.2 | 23.1 |
| $nC_5$ | 23.4 | 12.1 |
| $C_6+$ | 54.4 | 38.1 |
| $H_2$ Consumed, SCF/bbl | 263 | |
| $C_5+$ Properties | | |
| Octane (R+0) | 67.4 | 79.9 |
| Octane (R+3) | 87.8 | 92.7 |
| Specific Gravity | .656 | .663 |
| Molecular Weight | 78 | — |
| Operating Conditions | | |
| Temperature, °F | | 711 |
| Pressure, psig | | 400 |
| $H_2$/Hydrocarbon Ratio | | 6.1 |
| LHSV | | 1.6 |
| ΔT, °F. | | 19 |

EXAMPLE 2

A system for processing kerosine to remove sulfur and improve color is shown in FIG. 3. The flow sheet is very typical of most hydrotreating units. The single reactor is modified in accordance with this invention as described in FIG. 1.

In many commercial refineries kerosine treating is conducted via blocked out operation because demand is seasonal. Therefore the unit is idle much of the time. In addition, refinements and improvements in commercial hydrotreating catalysts allow increased throughputs and thus additional unit time is available. It is inconvenient and costly to remove the catalyst or to install a parallel reactor so that this unit could be more fully utilized. The parallel reactor concept of this invention overcomes this problem. Thus low octane naphthas such as typical light virgin naphthas can be processed by using shape selective catalyst as catalyst A and a suitable hydrotreating catalyst as catalyst B (FIG. 1). Table III shows that the nominal operating conditions for operating with either catalyst are compatible in this arrangement.

In applying this parallel bed reactor concept to a hydrotreater/shape selective hydrocracker, as shown in FIG. 3, the reference numbers applied to FIG. 1 indicate similar elements in FIG. 3.

When the unit is used as a shape selective hydrocracker (catalyst A only), light naphtha from line 51 combined with make-up hydrogen from line 55 and recycle hydrogen from line 59 (valve 56 open) are heated in heater 31. Valve 5 is open and valve 1 is closed. Effluent of heater 31 passes through pipe 16 to plenum chamber 14, thence upwardly through shape selective catalyst A to plenum chamber 13 from which product is withdrawn through open valve 2 and passed by line 42 to high pressure separator 38, valves 1 and 4 being closed. Hydrogen rich gas passes overhead by line 39 while product exits by line 41. Preferably a small amount of inert gas is admitted through open valve 3 to plenum chamber 15 to flow upward through catalyst B, inhibiting diffusion of reactive material into that catalyst. In this case, line 43 serves to supply that gas for the purpose stated.

When it is desirable to bypass the shape selective catalyst and utilize the unit as a hydrotreater (catalyst B only), kerosine and hydrogen are heated in heater 31. Heater effluent then passes through open valve 5 to plenum chamber 14, catalyst B and plenum chamber 15 to line 19. Valve 4 being open and valve 3 being closed, the product is diverted to high pressure separator 38. It will be apparent that a small amount of purge gas may be passed through line 17 to avoid diffusion of reactive materials into the bed of catalyst A in a manner analogous to that employed above when catalyst B is out of service. Table III compares operating conditions and product properties for typical runs of kerosine treating and selective hydrocracking of light naphtha.

TABLE III

CATALYTIC HYDROTREATING/SHAPE SELECTIVE HYDROCRACKING

| Mode of Operation<br>Charge: | RUN IIIA<br>Catalyst A<br>$C_5$–180°F. Kirkuk Naphtha | | RUN IIIB<br>Catalyst B<br>Kerosine | |
|---|---|---|---|---|
| Yield, wt % of Hydrocarbon<br>Charge | Charge | Product | Charge | Product |
| $C_1$ | — | 0.6 | — | — |
| $C_2$ | — | 1.2 | — | — |
| $C_3$ | — | 18.9 | — | — |

TABLE III — Continued

CATALYTIC HYDROTREATING/SHAPE SELECTIVE HYDROCRACKING

| | RUN IIIA | | RUN IIIB | |
|---|---|---|---|---|
| Mode of Operation | Catalyst A | | Catalyst B | |
| Charge: | $C_5$–180°F. Kirkuk Naphtha | | Kerosine | |
| Yield, wt % of Hydrocarbon Charge | Charge | Product | Charge | Product |
| $iC_4$ | — | 0.4 | | |
| $nC_4$ | — | 6.2 | | |
| $iC_5$ | 22.2 | 23.1 | — | — |
| $nC_5$ | 23.4 | 12.1 | — | — |
| $C_6+$ | 54.4 | 38.1 | — | — |
| Kerosine | | | 100.0 | 99.9 |
| $H_2$ Consumed, SCF/BBL | 263 | | | |
| Properties | | | | |
| $C_5+$ Octane, R+O | 67.4 | 79.9 | | |
| $C_5+$ Octane, R+3 | 87.8 | 92.7 | | |
| $C_5+$ Specific Gravity | 0.656 | 0.663 | | |
| $C_5+$ Molecular Wt. | 78 | — | | |
| Sulfur, Wt.% | | | 0.24 | 0.20 |
| Mercaptan, ppm | | | 273 | 8 |
| Operating Conditions | | | | |
| Temperature, °F. | 742 | | 670 | |
| Pressure, psig | 400 | | 430 | |
| $H_2$/HC Ratio | 6.1 molar | | 320 SCF/BBL | |
| LHSV | 1.6 | | 4.8 | |

Very often the light naphtha concentration in certain crudes are greater than can easily be blended off into gasoline. Accumulation of this naphtha for subsequent blocked out SSC operation is an attractive use of this material. It is obvious that in certain refineries other feed stocks, as long as they contain normal paraffins, could be worked off in this manner to produce higher octane gasoline or propane. Typical examples would be raffinate, heavy naphtha, excess normal pentanes, etc.

The invention is here illustrated with respect to downward flow through the catalyst beds when used in series and flow from the intermediate plenum chamber when one catalyst bed is to be used alone. It will be readily apparent that these directions of flow may be modified in any desired manner to suit design considerations in the environment in which the invention is used.

We claim:

1. A new use for a dual catalyst converter having an upper bed of platinum group metal on alumina reforming catalyst and a lower bed of shape selective hydrocracking catalyst to afford flexibility in operation to pass reactants selectively through both beds in sequence or through either bed alone which comprises:

a. arranging the two discrete beds in spaced apart relation and each spaced from the extremity of the converter adjacent thereto thereby providing a common plenum chamber between the beds and a terminal plenum chamber adjacent each bed on the side thereof remote from the other bed;

b. providing inlet means to the common plenum chamber;

c. providing both inlet means and outlet means to each of the terminal plenum chambers;

d. supplying a naphtha charge convertible by both of said catalysts in sequence to the said terminal plenum chamber adjacent the upper said bed of reforming catalyst and withdrawing conversion products from the other of said terminal plenum chambers whereby the conversions characteristic of said two catalysts are accomplished in sequence; and e. interrupting the flow recited in (d) and selectively accomplishing conversion by one of said catalyst alone by introducing a naphtha charge convertible by a selected one of said catalyst beds to said common plenum chamber and withdrawing conversion products from the terminal plenum chamber adjacent the said selected catalyst bed.

* * * * *

PO-1050
(5/69)

UNITED STATES PATENT OFFICE
CERTIFICATE OF CORRECTION

Patent No. 3,844,934      Dated October 29, 1974

Inventor(s) JOHN C. BONACCI and KENNETH M. MITCHELL

It is certified that error appears in the above-identified patent and that said Letters Patent are hereby corrected as shown below:

| | |
|---|---|
| Column 4, line 13 | "that the" should be --this is the--. |
| Column 9, line 22 TABLE III | Under caption "Operating Conditions, sub-caption Temperature, °F." "742" should be --711--. |
| Column 9, line 27 | "are" should be --is--. |

Signed and sealed this 22nd day of April 1975.

(SEAL)
Attest:

RUTH C. MASON
Attesting Officer

C. MARSHALL DANN
Commissioner of Patents
and Trademarks